(12) United States Patent
    Wallace

(10) Patent No.: US 6,192,475 B1
(45) Date of Patent: Feb. 20, 2001

(54) SYSTEM AND METHOD FOR CLOAKING SOFTWARE

(76) Inventor: David R. Wallace, 1960 Jones St., San Francisco, CA (US) 94133

(*) Notice: Under 35 U.S.C. 154(b), the term of this patent shall be extended for 0 days.

(21) Appl. No.: 09/048,138

(22) Filed: Mar. 25, 1998

Related U.S. Application Data

(60) Provisional application No. 60/042,266, filed on Mar. 31, 1997.

(51) Int. Cl.⁷ .................................................. H04L 9/00

(52) U.S. Cl. ...................... 713/190; 713/187; 713/189; 713/193; 705/55

(58) Field of Search ..................... 713/187, 190, 713/189, 193; 705/55

(56) References Cited

U.S. PATENT DOCUMENTS

| | | | |
|---|---|---|---|
| 4,471,163 | 9/1984 | Donald et al. | 178/22.08 |
| 4,558,176 | 12/1985 | Arnold et al. | 178/22.08 |
| 4,562,305 | 12/1985 | Gaffney, Jr. | 178/22.08 |
| 4,565,901 | 1/1986 | Best | 178/22.08 |
| 4,571,678 | 2/1986 | Chaitin | 364/300 |
| 4,584,641 | 4/1986 | Guglielmino | 364/200 |
| 4,593,353 | 6/1986 | Pickholtz | 364/200 |
| 4,644,493 | 2/1987 | Chandra et al. | 364/900 |
| 4,796,220 | 1/1989 | Wolfe | 364/900 |
| 5,109,413 | 4/1992 | Comerford et al. | 380/4 |
| 5,123,045 | 6/1992 | Ostrovsky et al. | 380/4 |
| 5,199,066 | 3/1993 | Logan | 380/4 |
| 5,222,133 | 6/1993 | Chou et al. | 380/4 |
| 5,249,295 | 9/1993 | Briggs et al. | 395/650 |
| 5,295,187 | 3/1994 | Miyoshi | 380/4 |
| 5,337,357 | 8/1994 | Chou et al. | 380/4 |
| 5,343,527 | * 8/1994 | Moore | 380/4 |
| 5,530,752 | 6/1996 | Rubin | 380/4 |
| 5,659,614 | * 8/1997 | Bailey, III | 380/4 |
| 6,009,543 | * 12/1999 | Shavit | 714/200 |

OTHER PUBLICATIONS

Allen, J.R., K. Kennedy, C. Porterfield and J. Warren, "Conversion of control dependence to data dependence," *Proc. Of the 10th ACM Symposium on Principles of Programming Languages*, pp. 177–189, Jan. 1983.

Kuck, D.J., R.H. Kuhn, D.A. Padua, B. Leasure and M. Wolfe, "Dependence graphs and compiler optimizations," *Proc. Of the 8th ACM Symposium on Principles of Programming Languages*, pp. 207–218, Jan. 1981.

Schrijver, Alexander, "Theory of lattices and linear diophantine equations," Chapter 4, *Theory of Integer and linear Programming*, John Wiley, New York, 1986, pp. 45–59.

(List continued on next page.)

Primary Examiner—Thomas R. Peeso
Assistant Examiner—Todd Jack
(74) Attorney, Agent, or Firm—Stephen J. LeBlanc; The Law Offices of Jonathan Alan Quine

(57) ABSTRACT

A system and method for rewriting software into a protected form, called cloaked software, such that this cloaked form is protected from analysis or reverse engineering while at the same time the cloaked software is executable. Further, said cloaked software may be set up so that it requires a correct key or keys to be supplied, when it is to be run, for it to execute correctly. Cloaking modifies the basic operations within the software so that the logical connections or data flow among the program operations is no longer visible. In fact, cloaking makes the correct dataflow among operations dependent on a complex interrelated set of addressing operations within the cloaked program. These addressing operations are designed so that their analysis is equivalent to a computationally intractable NP-complete problem. This situation prevents reverse-engineering and unauthorized tampering. Further, these interrelated addressing operations may be set up to use a key or keys in a way that is integral to their operation. This makes the key or keys necessary for correct program operation in such a way that removing the program's need for the keys requires the solution of an NP-complete problem.

22 Claims, 10 Drawing Sheets

OTHER PUBLICATIONS

Wallace, David, "Dependence of Multi–Dimensional Array References," *Proceedings of the International Conference on Supercomputing*, Jul. 1988, pp. 418–428.

Michael Jos Wolfe, *Optimizing Supercompilers for Supercomputers*, UMI Dissertation Services (1988).

* cited by examiner

```
t = 0;
i = 1;
j = 2;
k = 2;
DO I1 = 1,100
    X(3*i-4*j+k+2*t-1, -2*i+7*j+5*t+2, i+2*j-3*k+5*t-3) = A(I1);
    y = D(I1);
        .
        .
    C(I1) = X(3*i-4*j+k+2*t-1, -2*i+7*j+5*t+2, i+2*j-3*k+5*t-3)
            + B(I1)*y;
    t = t + 1;
    i = i + 2;
    j = j + 3;
    k = k - 5;
    END
```

Fig. 14

```
t = 0;
i = 1;
j = 2;
k = 2;
DO I1 = 1,100
    X(MR) = A(I1);
    y = D(I1);
        .
        .
    C(I1) = X(MR+M') + B(I1)*y;
    t = t + 1;
    i = i + 2;
    j = j + 3;
    k = k - 5;
END
```

Fig. 15

```
t = 0;
i = 1;
j = 2;
k = 2;
DO I1 = 1,100
   X(3*i-4*j+k+2*t-1, -2*i+7*j+5*t+2, i+2*j-3*k+5*t-3) = A(I1);
   y = D(I1);
   .
   .
   C(I1) = X(5*i-5*j+k-3*t+2, 8*j+k+3*t+8, 4*j-2*k+6*t+2)+
   B(I1)*y;
   t = t + 1;
   i = i + 2;
   j = j + 3;
   k = k - 5;
   END
```

Fig. 16

```
t = 0;
i = 1;
j = 2;
k = 2;
DO I1 = 1,100
   X(3*i-4*j+k+2*t-1, -2*i+7*j+5*t+2, i+2*j-3*k+5*t-3) = A(I1);
   X(4*i-1*j+4*k+8*t-10, -6*i+14*j+2*k+6*t+7, -6*i+19*j+5*k+13*t)
   = D(I1);
   .
   .
   C(I1)= X(5*i-5*j+k-3*t+2,8*j+k+3*t+8, 4*j-2*k+6*t+2) + B(I1)*
       X(6*i-1*j+5*k+9*t-8, -7*i+15*j+k+6, -4*i+20*j+4*k+1*t+2);
   t = t + 1;
   i = i + 2;
   j = j + 3;
   k = k - 5;
   END
```

Fig. 17

SYSTEM AND METHOD FOR CLOAKING SOFTWARE

This application claims priority to the preliminary application Ser. No. 60/042,266 filed Mar. 31, 1997.

FIELD OF THE INVENTION

This invention relates to the field of software security or protecting software from unauthorized use and from unauthorized analysis or modification, including reverse engineering.

BACKGROUND OF THE INVENTION

Unauthorized software use, or software piracy, has cost software producers and distributors billions of dollars worldwide. Consequently, there have been a number of methods developed to prevent software piracy.

One of the early approaches was to use various schemes to prevent copying of software. The was not popular with legitimate users, who wished to make backup copies. Further, these anti-copy schemes were based on methods that were so simple that programs were developed and sold that disabled the anti-copy mechanisms, thereby allowing unlimited copying. The whole approach was eventually dropped.

Another approach that is currently in use, involves a hardware key, sometimes referred to as a dongle. The dongle must be plugged into a port on the computer that is to run the software application in question. Functions are hidden within the application to be controlled that interrogate a key or keys in the dongle to verify authorization. The inconvenience of distributing and managing the dongle hardware devices has limited the use of this method to a very small market. Further, the method is not very secure since it is easy for an expert to find and bypass the software functions that interrogate the dongle.

Another approach has developed within the environment of local business networks; that is electronic license management. Within a network of computers, one particular computer is designated and set up as the license server for the whole network. This license server acts somewhat like the dongle described above, in that it provides keys and authorization information to other computers on the network. Protected applications contain hidden functions that interrogate the license server to verify authorization. These systems are not very popular since when there are network problems or when the license server itself fails, all associated applications stop working throughout the network. Further, like the dongle system, it is easy for an expert to find and bypass the interrogation functions hidden in the application.

Further, none of the above systems provide any protection against reverse engineering or unauthorized analysis and modification. These current anti-piracy systems provide no impediment to common reverse engineering techniques that can be used to discover confidential designs or to allow unauthorized modifications to the software.

An apparent solution, with some real security, might come from using technology developed for encrypting text. Executable software can be treated as binary text and encrypted using this well-known technology. The problem is that such encrypted software cannot execute or run. The only way to run it is to decrypt it back to its original form. Of course, once that is done, it can be copied or pirated.

SUMMARY OF THE INVENTION

It is the object of this invention to provide an improved process and method of encrypting software applications.

The present invention comprises a method and apparatus of encrypting software applications, called cloaking, so that the cloaked applications can run or execute correctly when supplied with the correct key or keys. Further, when software has been cloaked, the task of decrypting it back to its original form, which can run without the need for keys, can be shown to be computationally intractable. In simple terms, you cannot decrypt it. In addition the software application is protected against reverse engineering and other unauthorized analysis or modification, even when keys are known. Further, the cloaked application will run at or near the speed of the original unencrypted application.

The cloaked software can be copied or distributed without the need for any keys, but it must have keys to execute properly. Although, if only reverse engineering protection is desired, the key values can be built in to the program.

The basic process of software cloaking is analogous to the compilation or binary translation process. The cloaking process entails:

reading in a standard representation of a program and translating it to an internal form analyzing and then cloaking the internal form translating the modified internal form into a standard representation and writing it out In software cloaking, the modification of the internal form consists in the encryption of some or all of the load or store operations in the program Encrypting a load or store operation entails replacing its addressing expression with a different one that is augmented with additional index expressions like an array reference. For example, the memory operand x will be replaced by one in the form $A(f_1(v_1), \ldots, f_n(v_n))$, where the subscript functions, $f_i(v_j)$, are linear functions of index variables. The calculation of these subscript functions in the program involves using special addressing values, including keys and possibly system identifiers, such that the various augmented memory operands will have the same overall effect as the original ones only when these special addressing values are correct. It is also possible to replace one array reference by another, augmented with additional index expressions.

The effect of this is as follows. Say the original program creates a value and stores it in a memory operand x. Later when the original program needs this value, it will load it from memory operand x. The cloaking process modifies the memory operand of the store to, say, $A(f(i))$ and the memory operand of the load to $A(g)j$, where i and j are index variables. In general, the new array reference forms will be more complex than these. With the proper addressing values, including keys or system identifiers, the store to $A(f(i))$ and the load from $A(g(j))$ will refer to the same memory location, even though that location will, in general, be different from that of x. Without the proper addressing values, the store to $A(f(i))$ will refer to a one memory location and the load from $A(g)j$ will refer to a different location. Consequently, the load will retrieve the wrong value. Conversely, without the proper addressing values, two different memory operands could refer to the same memory location, again resulting in incorrect values.

During normal, non-cloaked, program operation, a single non-array scalar variable is used repeatedly to hold values: the single variable is set to a value, used one or more times and then later reset with a new value and then that value is used and so on, all using the same storage location. These new values are always placed in the same location, so they are easy to analyze. After cloaking, new values are placed in constantly changing locations and further the uses of these values are done using addressing expressions that look like they are not related to the addressing expression that was used to set the value. Actually determining when addressing expressions refer to the same memory location, for the constantly changing index values in this context, requires solving a very difficult array dependence problem. This problem is known to be computationally intractable, specifically in technical terms, NP-complete. This implies that, with software cloaking, the problem of decryption can be made as difficult as desired.

BRIEF DESCRIPTION OF THE DRAWINGS

FIG. 14 shows the expanded result of replacing a simple scalar memory reference, x, by an array form with subscript expressions.

FIG. 15 shows the matrix form of FIG. 14 with a masking matrix, M', added.

FIG. 16 shows the expanded subscript form of FIG. 15.

FIG. 17 shows the expanded form of the same example, but with two simple scalar variables, x and y, replaced by array references.

DETAILED DESCRIPTION OF THE PRESENT INVENTION

Figure 1:
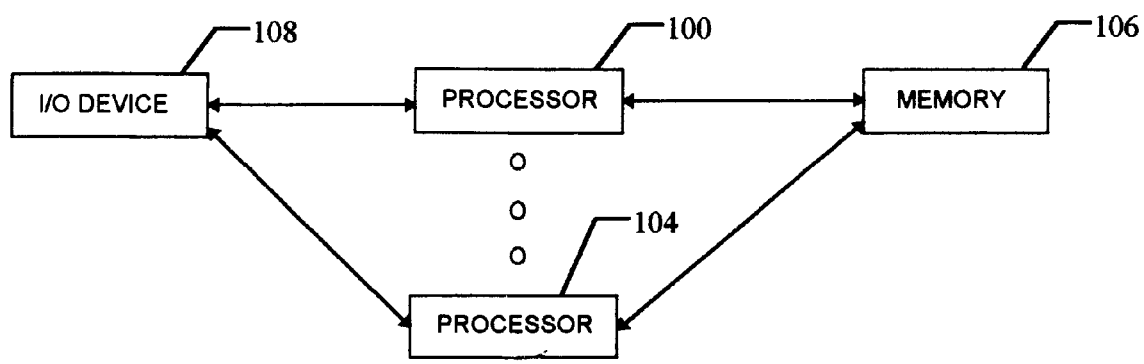
FIG. 1 is a block schematic of a system in which the invention may be practiced.

FIG. 1 is a block diagram of an exemplary system in which the teachings of this invention may be employed. The system includes a plurality of processors, such as 100 and 104, connected to storage memory, 106. In addition the plurality of processors is connected to an I/O device 108, through which processors may communicate with outside devices, other processors or with communication networks.

The present invention also can be used with simple processor systems. Different computer systems will typically be used to cloak a program and to run the cloaked program.

We refer to either a load or store operation as a variable reference. An index variable is one that is used to compute the addressing of array or array-like variables. Such addressing typically involves base pointers along with various offset values. Index variables are usually associated with arrays in loops and are updated around the loops. However, of course, arrays may be used in other sections of code that are not loops. Index expressions are expressions created from index variables and used as subscripts in array or pointer dereference operations.

Index variables are characterized by the following components.

initialization: the index variable is given a starting value before entry into a loop or other section of code increment: after the code section, the index variable is incremented by a fixed, usually constant, amount reset: this operation detects when an index variable has reached some upper limit and then resets it to an initial value. In the case of loops, the reset is normally accomplished by termination code that causes a branch back to the above-mentioned initialization code. For the purposes of this invention, we sometimes insert separate reset code without using the above-mentioned initialization code.

An induction variable is a particular type of index variable with very regular increment code that is always associated with one or more loops. This is a concept that is well-known to those practiced in compiler optimization.

Disguising Simple Variable References

Below is a simple loop with array references.

DO I=1,100
    A(I)=B(I)+C(I);
END

After compiler transformation to a lower level form, it looks like the following, where we assume a byte addressable machine and that each array element consists of 8 bytes.

a_base=address(A);
b_base=address(B);
c_base=address(C);
n=0;
i=1;
loop1:load (b_base+n)→R2;
    load (c_base+n)→R2;
    R1+R2→R3;
    store R3→(a_base+n);
    n=n+8;
    i=i+1;
    if (i <=100) goto loop1;

The variable i is usually called the loop control variable or primary induction variable. The variable n is a secondary induction variable depending on i, with relation $n=8*(i-1)$.

Encoding variable references: We shall encode x and y in the loop below.

DO I1=1,100
    x=A(I1);
    y=D(I1);
    .
    .
    C(I1)=x+B(I1)*y;
END

We first add some induction variables: i, j, k, and t.

```
t = 0;

i = 1;

j = 2;

k = 2;

DO I1 = 1,100 x = A(I1);

y = D(I1);

...

C(I1) = x + B(I1)*y;

t = t + 1;

i = i + 2;

j = j + 3;

k = k - 5;

END
```

The next step is to form a matrix, MR, the same shape as M', but with randomly chosen entries, such as:

$$\text{matrix MR}$$

$$\begin{array}{rrrrr} 3 & -4 & 1 & 2 & -1 \\ -2 & 7 & 5 & 0 & 2 \\ 1 & 2 & -3 & 5 & -3 \end{array}$$

Then we transform the loop as follows, creating a new three-dimensional array, X.

```
t = 0;

i = 1;

j = 2;

k = 2;

DO I1 = 1,100

X(MR) = A(I1);

y = D(I1);

...

C(I1) = X(MR) + B(I1)*y;

t = t + 1;

i = i + 2;

j = j + 3;

k = k - 5;

END
```

The dimension ranges for X can be derived from the ranges of the induction variables and from the matrix MR.
t-range: 0→99
i-range: 1→199
j-range: 2→299
k-range: −493→2

For dimension 1 the MR row is (3,−4, 1,2,−1), corresponding to 3i−4j+k+2t−1. The maximum possible value for this is 3*199−4*2+2+2*99−1=788. In most cases this will be more than is actually needed, but it is safe. The minimum is 3*1−4*2−493+2*0−1=−499. The other dimensions can be computed similarly. Now the references to the array X jump around in a complex manner, not at all like the fixed scalar reference to x. Expanding the MR matrix to the standard subscript form is shown in FIG. 14.

Of course, these two references still look the same—to disguise them we create what we call a masking matrix.

From the above loop, simple induction variable analysis derives the following relations, R1:
i−2t=1
j−3t=2
k+5t=2
These relations correspond to the following matrix:

$$\text{matrix M}$$

| i | j | k | t | const |
|---|---|---|---|---|
| 1 | 0 | 0 | −2 | 1 |
| 0 | 1 | 0 | −3 | 2 |
| 0 | 0 | 1 | 5 | 2 |

We then apply some elementary row operations:

$$\text{matrix M after adding row 2 to row 1}$$

| i | j | k | t | const |
|---|---|---|---|---|
| 1 | 1 | 0 | −5 | 3 |
| 0 | 1 | 0 | −3 | 2 |
| 0 | 0 | 1 | 5 | 2 |

Next we have matrix M after further adding row 3 plus 2 times row 1 to row 2 and also adding 2 times row 2 minus row 1 to row 3.

$$\text{Matrix M}'$$

| i | j | k | t | const |
|---|---|---|---|---|
| 1 | 0 | 0 | −5 | 3 |
| 2 | 1 | 1 | −2 | 6 |
| −1 | 2 | 1 | 1 | 5 |

If ARR is a three dimensional array, we can write an array reference corresponding to this array as follows:

$$ARR(M')=ARR(i+j-5*t+3,\ 2*i+j+k-2*t+6,\ -l+2*j+k+t+5)$$

Because the relations R1, above, hold within the above loop, the net effect of these subscript expressions is zero, that is ARR(0, 0,0)=ARR(M'). We call a matrix derived this way, such as M', a masking matrix.

Now we add the matrix M' to one of the references as shown in FIG. 15.

Then the two X references do not appear to be the same, even though they are the same in this loop context. The expanded form is now as in FIG. 16.

The next step is to replace the other scalar variable, y. To do this we need a matrix that never has a zero solution. There are many known ways to create such arrays known in the current state of the art. One is to create a matrix with one row having zero for the variable components and a non-zero constant component, such as (0 0 0 0 2). We call this a poison row. Clearly, no choice of variables will result in a solution for such a row and consequently there is no simultaneous solution for the matrix as a whole. Further, the existence of such a row can be disguised by matrix row operations.

This poison row approach can be expanded as follows. First choose a (linear) constraint, such as that derived from loop bounds, of the form $f(x) \leq c$. The facet equation for this constraint is then $f(x)=c$. Next, choose a constant $c'>c$ and form $f(x)=c'$. It follows that any solution satisfying this equation cannot satisfy the constraint inequality, thus blocking a solution. We discuss more sophisticated approaches to the separation problem later.

Now, getting back to our example, we choose a matrix with random coefficients, except for a poison row:

matrix MP $$\begin{array}{cccc} 1 & 3 & 4 & 6 & -9 \\ -4 & 7 & 2 & 1 & 5 \\ 0 & 0 & 0 & 0 & 2 \end{array}$$

After some row operations we get:

matrix MP'

$$\begin{array}{cccc} 1 & 3 & 4 & 6 & -9 \\ -4 & 7 & 2 & 1 & 5 \\ -7 & 17 & 8 & 8 & 3 \end{array}$$

Then if we create two references whose difference is MP', these two references can never interfere—since MP' has no zero solution. We call a matrix with no solution, such as MP', a separation matrix. This allows us to combine the two references x and y into the same array space without their interfering with each other. In general, two matrices that differ by a separation matrix cannot interfere. Let M" be another masking matrix based on M above:

matrix M"

$$\begin{array}{cccc} 2 & 0 & 1 & 1 & 4 \\ -1 & 1 & -1 & -6 & -1 \\ 2 & 1 & -1 & -12 & 2 \end{array}$$

Then our final transformation is as follows.

t = 0;
i = 1;
j = 2;
k = 2;
DO I1 = 1,100
   X(MR) = A(I1);
   X(MR + MP') = D(I1);
   ⋮
   C(I1) = X(MR + M') + B(I1) ∗ X(MR + MP' + M");
t = t + 1;
i = i + 2;

-continued j = j + 3;
k = k − 5;
END

The expanded form is now shown in FIG. 17.

Note that although these expressions do appear to be unwieldy, they are simple linear expressions that are easy candidates for compiler optimization, specifically strength reduction, which replaces the constant multipliers by additions of new induction variables. Newer processors, such as the Intel Pentium Pro, are very well suited to dealing with this additional addressing code, because of their powerful dynamic scheduling and data caching systems.

The NP-completeness principle blocks the static analysis of variable references that have been disguised by masking and separation matrices. However, one of the main tools that hackers use is a debugger to examine the dynamic behavior of a program. If the dynamic behavior of a program is too regular, a hacker could guess the relationship among variable references. The NP-completeness principle says that the hacker could never know for sure that such guesses were correct, but they might be. To make this type of guessing (based on dynamic behavior) more difficult we used the matrix MR, with random coefficients, to randomize the program's dynamic behavior.

Taking Advantage of Control Flow

Other than this random matrix, there are further strategies that can be used to enhance the effectiveness of the masking and separation matrices. One such strategy is path-dependent index variables, which makes a variable location dependent on different paths through the program. In the example below, the variable 'a' can be set in either the if-path or the else path.

DO I=1,100;
read p
if (p) a=x;
   else a=y;
write a;

In the transformation below, z is a path-dependent index variable used with the array A The actual location where the data is now stored that was in 'a' depends on the history of the execution path around the loop and through either the 'if' or 'else' choices.

declare A(100) integer;
i=1;
z=1;
loop2:read p;
  if (p) begin
    z=z+1;
    A(z)=x;
    end
  else begin
    z=z +2;
    A(z)=y;
    end
write A(z);
i=i+1;
if (z>98) z=1;
if (i<100) goto loop2;

Lifetimes

A variable lifetime is a region of the program over which a particular program variable holds a value that could be used along some control flow path. Consequently a variable lifetime begins with one or more definitions of the associated variable and ends with one or more uses of said associated variable. Note that the concept of variable lifetimes and process of identifying them is well known to those versed in compiler optimization.

Two overlapping lifetimes are said to conflict or interfere. Also well known is the process of organizing variable lifetimes into an interference or conflict graph. The conflict graph is undirected The conflict graph tells when two lifetimes overlap and consequently could never be mapped or reassigned to the same storage area. Some lifetimes have language dependent restrictions that prevent them from being remapped to different storage. When such special restrictions are absent, a variable may be remapped to a different storage location and when two variables do not conflict they may be mapped to the same location. The standard compiler process of register allocation is just a remapping of lifetimes to registers. This same conflict graph is also used in register allocation. The conflict or interference graph is discussed by Chaitin in U.S. Pat. No. 4,571,678 and by Briggs et al. in U.S. Pat. No. 5,249,295, both of which deal with register allocation.

Graph coloring is the process of assigning abstract colors to each vertex of a of the graph in such a way that two vertices connected by an edge do not have the same color. It is a well-known NP-complete problem. The coloring process is discussed in U.S. Pat. Nos. 4,571,678 and 5,249,295 for the case when colors are registers. We assume that the colors used for a particular problem have a natural order. If they do not, they can always be assigned one. One simple coloring heuristic is as follows:

1) First, order the graph vertices according to the highest degree first, where the degree of a vertex is the number of edges meeting that vertex. When the degrees of two vertices are the same, use an arbitrary ordering choice.
2) Then color each vertex in the order determined in 1) by means of 3) below, until all vertices are assigned colors.
3) To color a vertex, v, collect a list of the colors of its neighbors that are already colored and assign to v the least color not on that list. Note that the neighbors of a vertex are those vertices connected to the original vertex by one edge. We may need to generate new colors when the neighbors use all existing colors.

More General Separation

In general it is more difficult to separate references using separation matrices than in the example above. References in all conflicting lifetimes must be separated Also, because of cycles in the conflict graph, we need a consistent assignment of separation matrices.

To accomplish this we try to set up the disguised references so that their difference is a separation matrix, as in the example above with the matrix MP'. Say we have lifetimes set up in the following pattern in a program, where 'define' marks the beginning of a lifetime and 'use' the end define a
define b
define c
use a
use b
use c Each of these three lifetimes conflict with one another so they must be separated Say M1, M2 and M3 are separation matrices for these respective lifetimes, including program constraints such as those derived from loop bounds. Constraints, such as i+1<= 5, are represented with a positive "slack" variable, such as i+p+1=5, where p is constrained to be non-negative. Then we must have no zero solution for the differences between each pair of matrices, M1-M2, M1-M3, M2-M3. We can block a zero solution for each conflict pair, by causing (at least) one row to fail to have a solution. So for each conflict pair we choose one row and prevent it from having a solution. Geometrically, each row is a single linear equation which determines a hyperplane. Slack variables restrict solutions to part of a hyperplane. The lack of a solution for a particular row then corresponds to their respective hyperplanes not intersecting. This is done as follows.

A facet equation for the constraint above has the form i+1=5, corresponding to a zero slack variable. A poison row is then obtained by increasing the constant, such as i+1=6. Any value of i satisfying this poison constraint cannot satisfy our original constraint $i+1 \leq 5$. Then we derive additional facet equations from other constraints and combine them along with at least one poison row in a random positive linear combination, that is a sum of the equations each multiplied by a random positive coefficient. The resulting row, called the separation row, is completely outside the valid solution set, so we use it for the row in the separation matrix.

For one lifetime we use any random matrix M, and for other lifetimes the matrix rows correspond to separation rows, M1 and M2. Any rows in M1 or M2 not used for separation are chosen randomly.

define X(M) {was a}
define X(M1){was b} separation row 1
define X(M2) {was c} separation row 2
use X(M)
use X(M1)
use X(M2)

Then M1-M will not have a solution because of separation row 1 in M1, M2-M because of separation row 2 and M1-M2 because of either separation row.

The Preferred Approach to Separation

Figure 5:
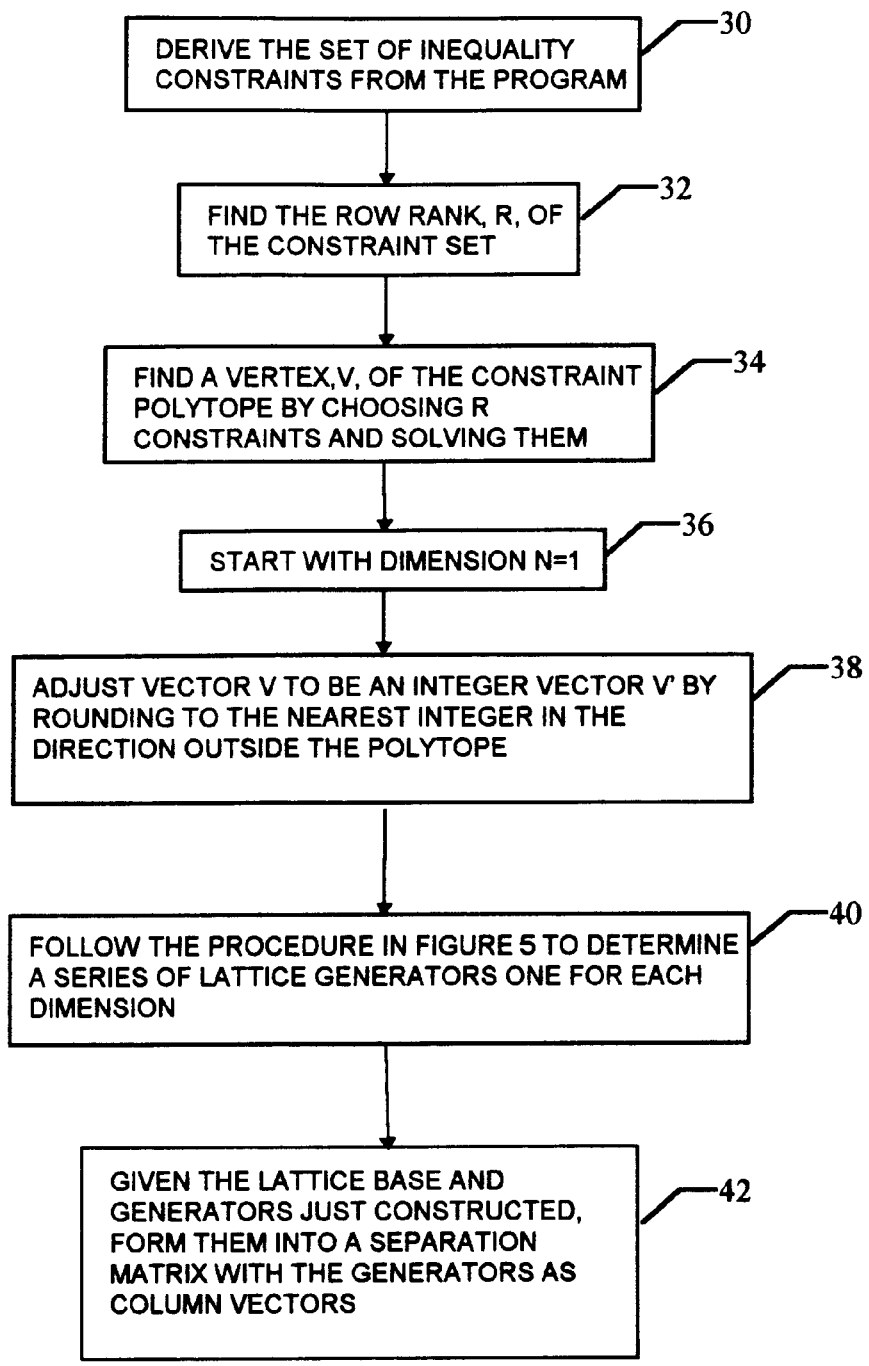
FIG. 5 is a flowchart that shows how separation matrices are constructed using lattice generators.

We derive from the program a set of inequality constraints which define what is usually called a polyhedron. We also refer to this polyhedron as an island. In order to construct independent (non-overlapping) references we construct a difference matrix equation which is a lattice that (just) misses the island Then any integer solution of the lattice matrix equation cannot satisfy the set of constraints. This is represented in FIG. 5.

A lattice is defined via a base vector and a set of linear independent generating vectors so that lattice points consist of integer multiples of the generating vectors added to the lattice base. In the procedure below we build up generating vectors one dimension at a time in a form like (a1,0,0), (a2,b2,0), (a3, b3,c3) in order to insure linear independence.

Figure 9:
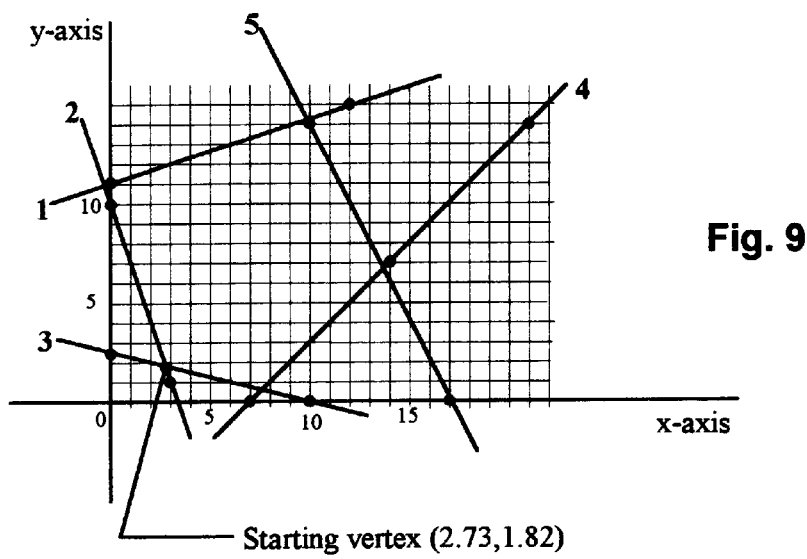
FIG. 9 is a diagram that shows a particular island of constraints with a starting vertex too begin the lattice point selection.

For example consider the following constraints:

1. $-x+3y \leq 33$
2. $3x+y \geq 10$
3. $x+4y>10$
4. $x-y \leq 7$
5. $2x+y \leq 34$ These constraints determine a convex polytope, as in FIG. 9. We form a separation matrix relative to these constraints as follows:

1. Say we have N dimensions—there are two in this case. Then we choose N equations and solve them to determine a vertex of the polytope. We call this the starting vertex. For example, choose equations 1 and 2. The solution is as follows.

$$\begin{array}{ccc} 3 & 1 & 10 \\ 1 & 4 & 10 \end{array} \rightarrow \begin{array}{ccc} 1 & -7 & 10 \\ 1 & 4 & 10 \end{array} \rightarrow \begin{array}{ccc} 1 & -7 & -10 \\ 0 & 11 & 20 \end{array} \rightarrow$$

$$\begin{array}{ccc} 1 & -7 & -10 \\ 0 & 1 & 20/11 \end{array} \rightarrow \begin{array}{ccc} 1 & 0 & 30/11 \\ 0 & 1 & 20/11 \end{array}$$

So x=30/11=2.73 and y=20/11=1.82 define the starting vertex of the polytope.

2. Next choose a point near the starting vertex, but not in the polytope. Since the interior of the polytope is in the positive direction from the starting vertex in both the x and y dimensions, we move in the opposite direction, reducing x=2.73 to x=2 and y=182 to y=1, i.e. we choose the point (2,1). This determines the "base" for the integer solution set (lattice) we are going to construct.

3. We then use the base to determine a line in one dimension: y=1. Intersect this line with each facet, choosing the one closest to the base (2,1) such that the base satisfies that one constraint, i.e. (2,1) is on the correct side of the facet. That facet corresponds to constraint 4 above. Now (2,1) satisfies constraint 4 and at the same time the intersection of y=1 with the facet (x−y=7) occurs when x=8, i.e. (8,1). Then we go (just) outside the polytope by going further in the x direction, choosing (9,1). This gives a difference vector of (7,0) from the base (2,1).

4. Then to get the next lattice generator, we choose another (temporary) starting point or base by decreasing (in the x direction) the point (9,1) derived above to (7,1). Next using this temporary base, we find a point outside the polytope. The equation x=7 extends in the y direction. As above find the intersection with a facet where (7,1) is satisfied—for example constraint 1. The intersection is (7, 40/3) or (7, 13.33). We go in the y-direction just beyond the constraint so we choose (7,14). This gives a difference from the base of (5,13). Then the solution lattice is determined by the base (2,1) and the two vectors (7,0) and (5,13). Algebraically the lattice is (2,1)+s(7,0)+t(5,13), for s and t integers.

Figure 10:
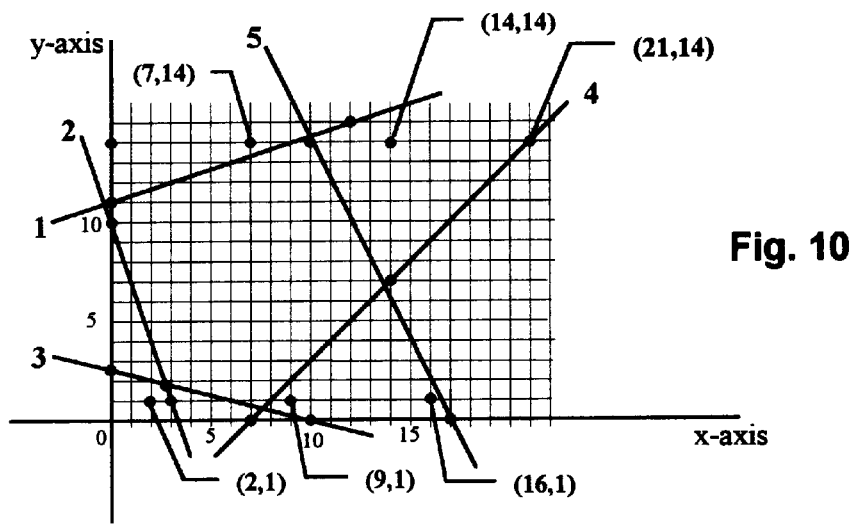
FIG. 10 is a diagram that shows the same island of constraints as in FIG. 9, but showing, in addition, some selected lattice points.

Some of the lattice points are (2,1), (9,1), (16,1), (7,14), (14,14)—these may be seen in FIG. 10.

We have lattice points (x,y)=(2,1)+s(7,0)+t(5,13).

5. Next we view the lattice generators, (7,0), (5,13), as column vectors and create a matrix M:

$$\begin{array}{cccc} s & t & x & y \\ -7 & -5 & 1 & 0 & =2 \\ 0 & -13 & 0 & 1 & 1 \end{array}$$

6. The values of x and y that satisfy this matrix equation are precisely the lattice values. This follows from the equation in step 4 above. Therefore the matrix M in 5 above is a separation matrix relative to the constraints 1–5.

7. Further we may now apply random row operations to matrix M, since this does not change its solution set.

Separating Two or More References

Say we have three references: A, B, C, that we wish to separate mutually. Let D1 be B−A and D2 be C−B. Then C−A is D1+D2. This means that to separate all three references, A, B, C, not only must D1 and D2 be separation matrices but D1+D2 must be also.

Figure 11:
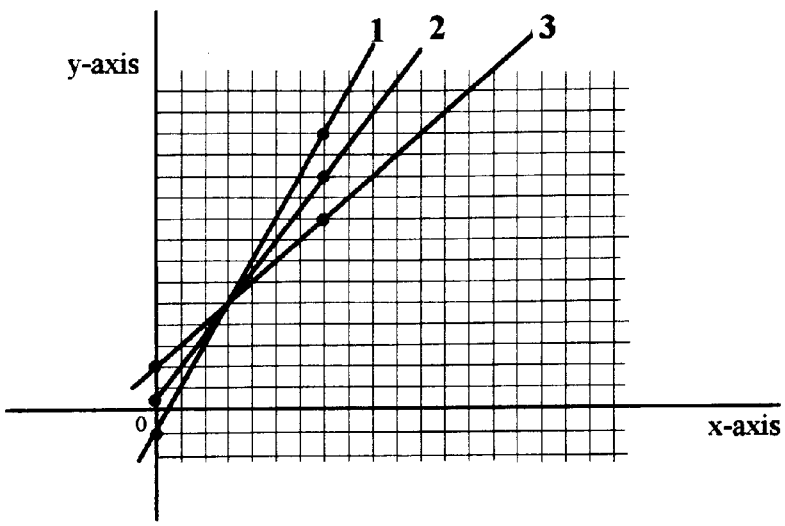
FIG. 11 is a diagram that shows the result of adding two solution sets, i.e. when the solution sets of lines 1 and 3 are added, the result is the solution set corresponding to line 2.

To understand this we must know how the solutions (zeros) of D1+D2 relate to the solutions of D1 and D2. First let us look at a simple example: y=2x−1 and y=x+2. These correspond to lines 1 and 3 in FIG. 11. Adding these two equations gives 2y=3x+1 or y=(3/2)x+½ which corresponds to line 2 in FIG. 11. Note that both the slope and y-intercept values of line 2 are just the average of the corresponding values for lines 1 and 3. So for a fixed value of x, the solution point for the sum is the midpoint of a line connecting the solution points for the summands. In FIG. 11 line 1 has a solution point of (7,13) and line 3 has (7,9). The corresponding solution point for line 2 is the midpoint of these, (7,11).

Lattice Matrix

Now, say we have a set of lattice generators. We then view them as column vectors and form a matrix M. We let I be the identity matrix and x a vector with B the lattice base vector. We then form a matrix equation:

Iz=Mx+B

Using the x-vector as (independent) parameters, this equation generates the set of lattice points, which are the resulting vector values for z. The corresponding separation matrix has the form (M−I B). The above equation's solution set is the same as the zero solutions for this matrix.

Say we have two such matrices: (M1−I B1) and (M2−I B2). Adding them together yields:

([M1+M2]−2I[B1+B2]) or, with the same solution set ([M1+M2]/2−I[B1+B2]/2)

It follows that the base vector and generating vectors of the lattice solutions for this sum matrix are just the average of the corresponding vectors for the vector summands. Thus given the two lattice points M1x+B1 and M2x+B2 the lattice point corresponding to the sum of the two summand matrices is ((M1+M2)/2)x+(B1+B2)/2.

Recall that above we choose a separation matrix to correspond to lattice points that just miss the constraint island We can see now that if we choose two (or more) sets of lattice points such that the points corresponding to a fixed x input are all beyond at least one constraint facet, then any sum of these matrices will have each corresponding lattice point outside this facet also. One consistent approach to accomplish this is to have the set of points, corresponding to a fixed x, for each separation matrix, fall within a convex set that does not meet the constraint island.

Figure 12:
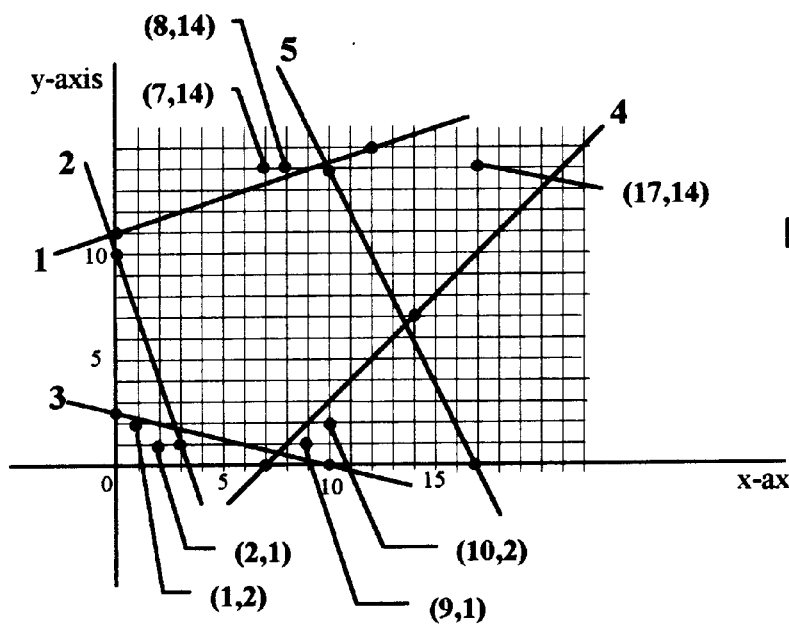
FIG. 12 is a diagram that shows some additional points from a new set of lattice points, showing how an additional set of lattice points is chosen.

This means that it is possible to choose separation matrices such that any sum of these separation matrices is again a separation matrix. FIG. 12 shows a lattice starting at (1,2) that is compatible with the previous lattice starting at (2,1). Both (1,2) and (2,1) are outside of constraint 2. Also (9,1) and (10,2) are outside of constraint 4. And (7,14) and (8,14) are outside of constraint 1.

Lifetime Coloring

We need to assign a color matrix to each lifetime such that if color matrices M1 and M2 conflict (i.e. their corresponding lifetimes are connected by an edge in the conflict graph), then M1−M2 is a separation matrix.

Based on the previous result we choose a series of separation matrices such that any sum of these matrices is again a separation matrix. Let $A_0$ be an arbitrary base matrix and $A_1$ through $A_n$ separation matrices. We then define $S_i$ to be the sum $A_0 + \ldots + A_i$. We view the $S_i$ as abstract colors and then color each lifetime in the lifetime conflict graph with the $S_i$. There are many well known and effective coloring algorithms, including the one described above. This coloring provides each lifetime with a color matrix. Note that the value of n depends on how many colors are needed to color the graph.

Figure 13:
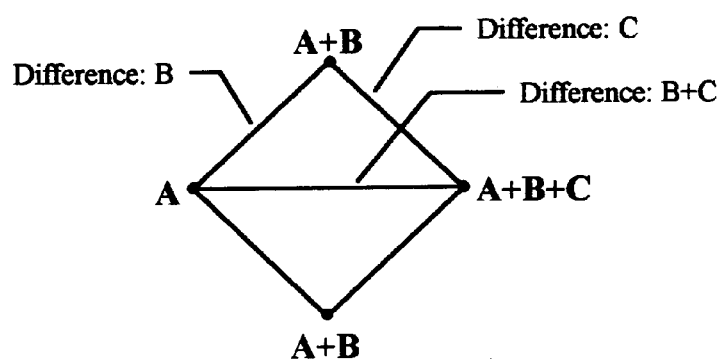
FIG. 13 shows part of a conflict graph and how its nodes are colored with color matrices so that the differences along each edge are sums of separation matrices.

Say we have two adjacent nodes in the conflict graph colored with $S_i$ and $S_j$ with $0<i<j$. Then $S_j-S_i=A_{i+1}+\ldots A_j$. Because of our selection of the $A_i$, this difference is a separation matrix. See FIG. 13 for an example.

Once each lifetime has a color lifetime (each properly separated), each reference within a lifetime has a masking matrix applied to it as described above.

The Software Cloaking Process

FIG. 1 is a block diagram of an exemplary system in which the software cloaking process may be employed.

Figure 2:
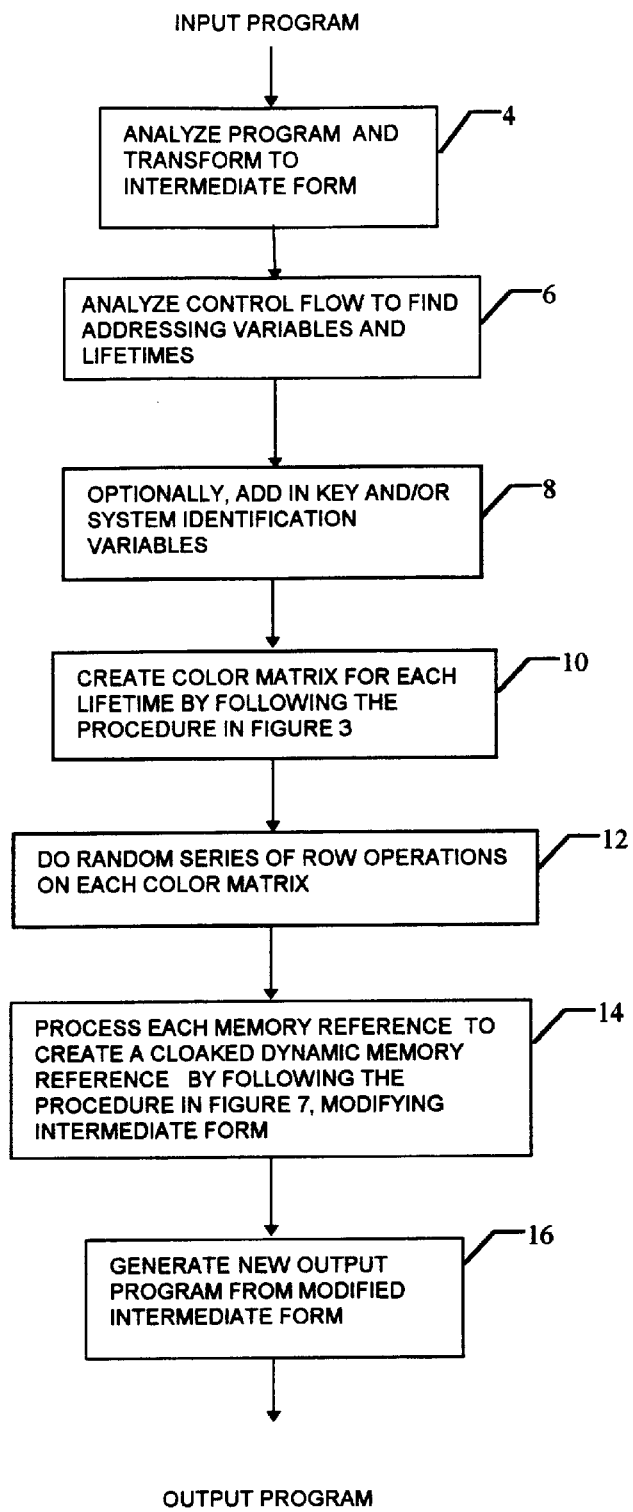
FIG. 2 is a flowchart that provides an overview of the cloaking process.

FIG. 2 shows a block diagram of the software cloaking process.

A. The software cloaking process is done via the following steps:
1. Input an existing program, which can be in object code form, source form, Java bytecodes or some other representation.
2. In block 4 analyze the program and transform it into a standard intermediate form, which we call IF. The IF includes operations like add, multiply, load, store and branch.
3. In block 6 analyze the program to gather variable information on:
   a) the original addressing variables including how they are initialized and updated across control flow, including loops.
   b) the lifetimes of scalar, pointer and array variables.
4. In block 8, if desired, add variables to hold system identification parameters and insert operations into the IF to initialize those variables. There are various ways known in the art to gather identifying information. This can be used to associate a program to a particular individual machine or to a license server in a network or to require some other association.
5. Also in block 8, if desired, select an encryption key or keys and insert program operations to place such keys in one or more variables. This is similar to step (A)4 above. Such keys may be derived or supplied from many possible sources including, but not limited to license token and direct keyboard input.
   If the options in blocks (A)4 and (A)5 are not chosen, then the invention provides intellecual property protection and blocks reverse engineering.
6. In block 10 create color matrix for each lifetime. This is detailed in B below.
7. In block 12 do a random series of row operations on each color matrix.
8. In block 14 cloak each memory reference, modifying intermediate form, following the procedure in F below, FIG. 7.
9. In block 16 generate new program code output using the modified IF. In most cases the output form will match the input, but this is not required.

Figure 3:
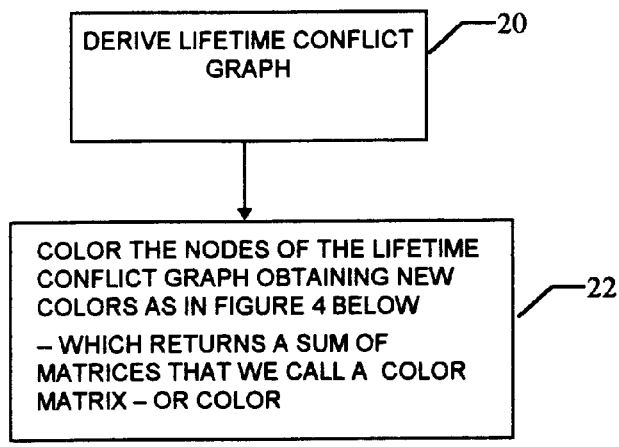
FIG. 3 is a flowchart that shows the details of creating a color matrix for each lifetime.

B. FIG. 3, expanding block 10, shows the details of creating a color matrix for each lifetime. We do this by viewing color matrices as "colors" and by creating a conflict graph to color. This process has the following steps:
1. In block 20 derive the conflict graph for the lifetimes found in (A)3b.
2. In block 22 color the nodes of the lifetime conflict graph. When a new color is needed, use the procedure in C, FIG. 4. A color is actually a sum of matrices and we call the color for a lifetime a color matrix.

Figure 4:
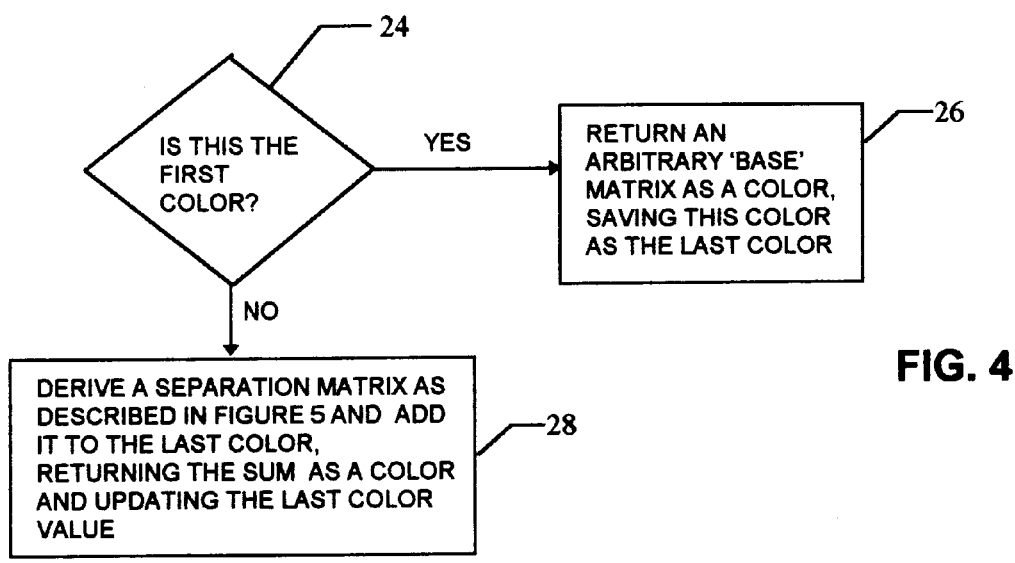
FIG. 4 is a flowchart that shows the derivation of colors by generating separation matrices.

C. FIG. 4, expanding block 22, shows the details of creating a new color. It has the following steps:
1. In block 24 if this is the first color requested, do step (C)2 otherwise step (C)3.
2. In block 26 return an arbitrary base matrix as a color, saving it in the last-color variable.
3. In block 28 derive a separation matrix as in D, FIG. 5, and add it to the last-color variable, returning the sum. Also update the last-color variable with this sum.

D. FIG. 5, expanding block 28, derives a separation matrix
1. In block 30 derive the set of inequality constraints from the program. These constraints determine what is called a constraint polytope—as exemplified by FIG. 9.
2. In block 32 find the row rank, R, of this constraint set. This is a well-known matrix operation.
3. In block 34 find a vertex, V, of the constraint polytope by choosing R constraints and solving them for a point.
4. In block 36 use N as a variable to determine the current dimension and initialize it to 1.
5. In block 38 in general the vector V will not be an integer vector. Round each component of V to its nearest integer creating a new vector V'. Each component is rounded in a direction to move it beyond at least one constraint. This results in the point (2,1) in FIG. 10.
6. In block 40 follow the procedure in FIG. 6 to determine a series of lattice generators, one for each dimension.
7. In block 42 take the lattice base and generators just constructed and form them into a separation matrix with the generators as column vectors.

Figure 6:
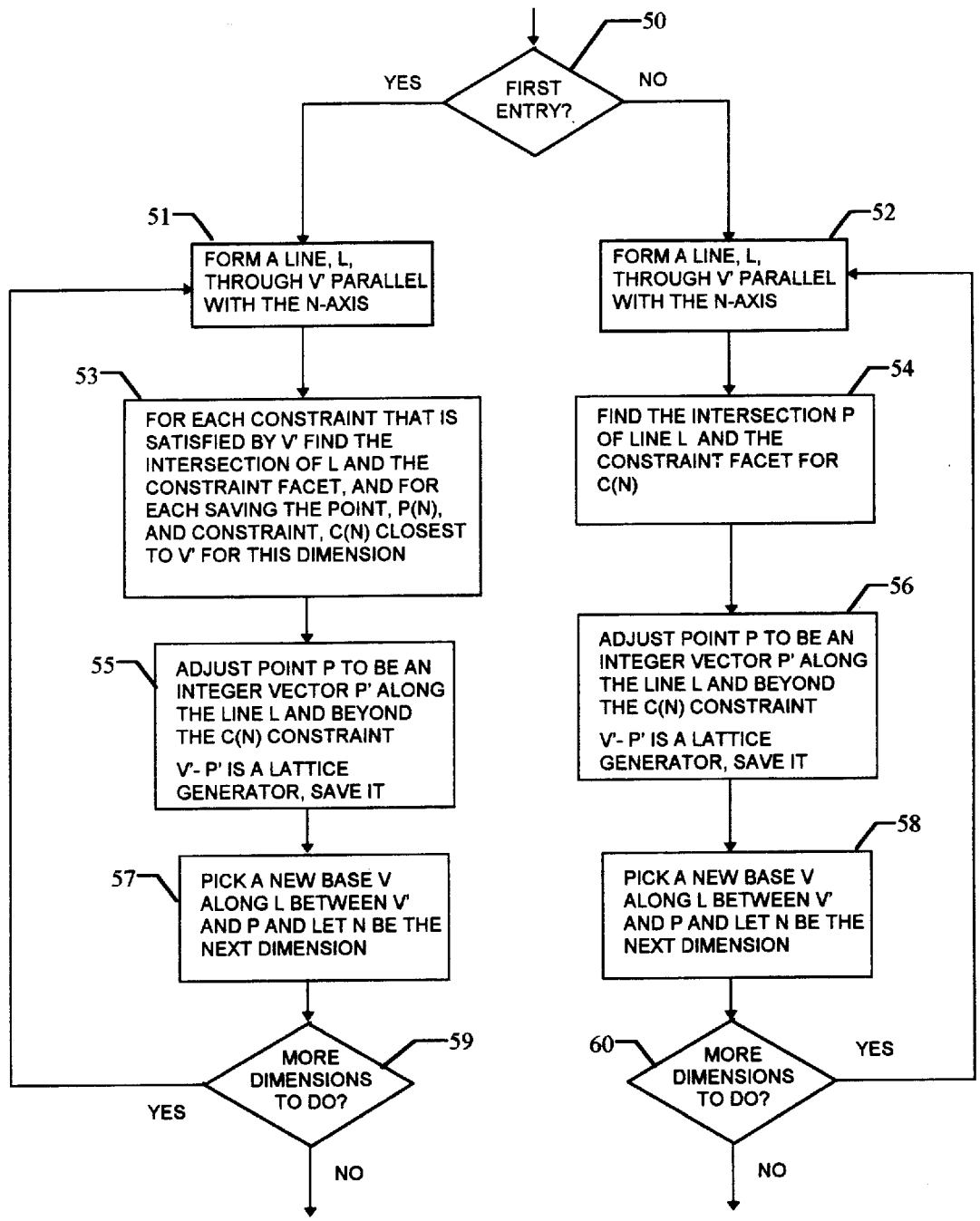
FIG. 6 is a flowchart that shows the details of constructing lattice generators.

E. FIG. 6, expanding block 40, determines a series of lattice generators, one for each dimension
1. In block 50 if this is the first time this procedure is called, proceed with step (E)2 below, otherwise step (E)7.
2. In block 51 form a line, L, through V' parallel with the N-axis.
3. In block 53 examine each constraint that is satisfied by V'; then for each such, find the intersection of L and that constraint facet (when the constraint inequality is strictly an equality). Determine which of these intersections is closest, say P, and then save the corresponding constraint as C(N).
4. In block 55 adjust point P to be an integer vector P', by moving P along the line L beyond the constraint C. Note that P must be moved far enough so that all lattice points generated so far are outside of the polytope. Then V'-P' is a lattice generator, save it as G(N).
5. In block 57 for the next iteration pick a new base value V along the line L between V' and P; also let N be the next dimension.
6. In block 59 if there are more dimensions to do, go to step (E)2, otherwise return back to step (D)6.
7. In block 52 form a line, L, through V' parallel with the N-axis.
8. In block 54 find the intersection of L and the constraint facet for C(N); call the intersection P.
9. In block 56 adjust point P to be an integer vector P', by moving P along the line L beyond the constraint C.

Note that P must be moved far enough so that all lattice points generated so far are outside of the polytope. Then V'-P' is a lattice generator, save it as G(N).

10. In block 58 for the next iteration pick a new base value V along the line L between V' and P; also let N be the next dimension.

11. In block 60 if there are more dimensions to do, go to step (E)7, otherwise return back to step (D)6.

Figure 7:
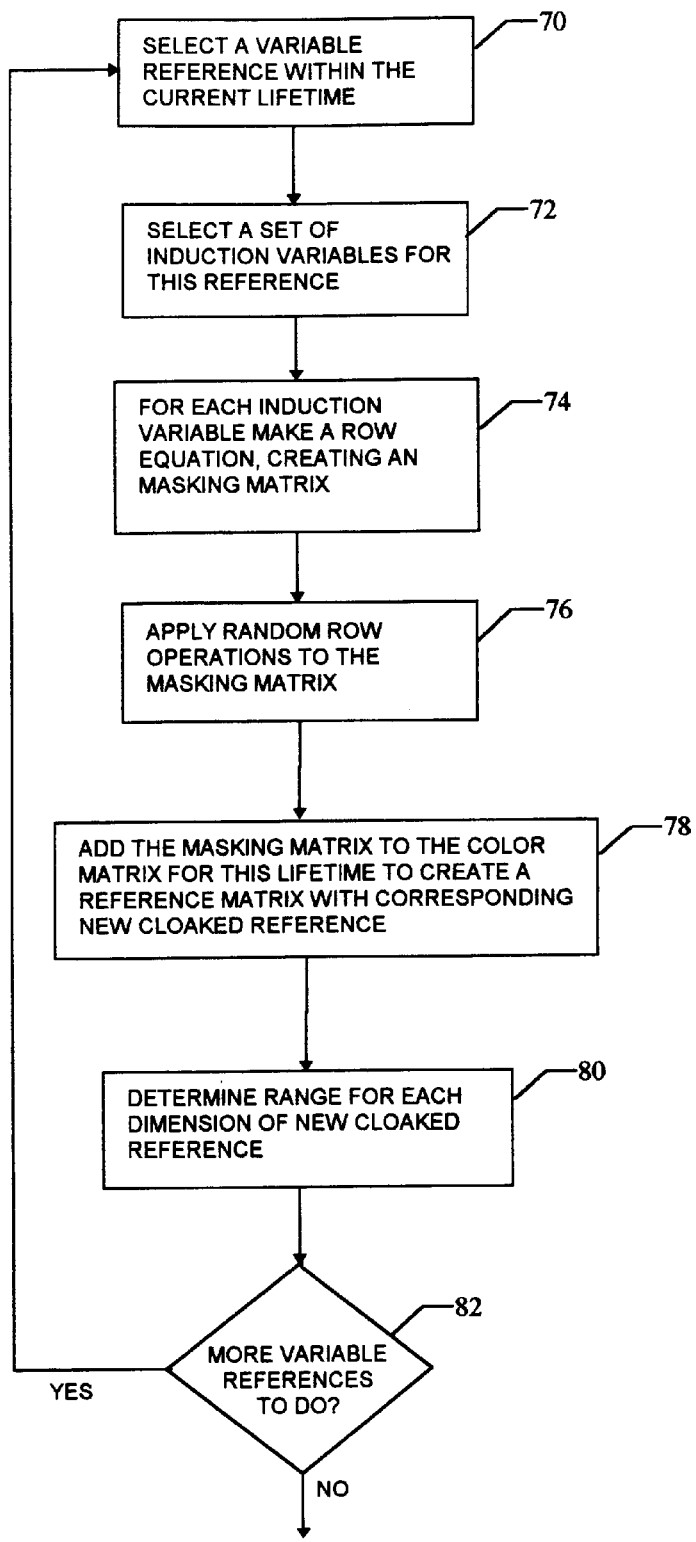
FIG. 7 is a flowchart that shows how the individual variable references within a lifetime are encrypted or cloaked.
Figure 8:
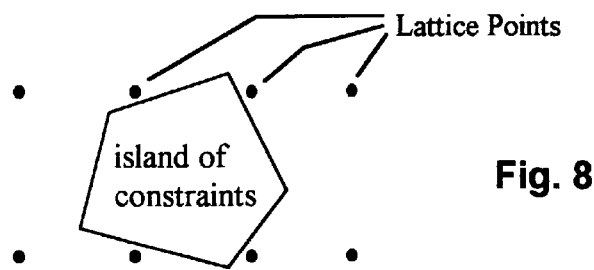
FIG. 8 is a diagram that shows in general how lattice points are chosen around an island of constraints.

F. FIG. 7, expanding block 14, represents the process of cloaking each variable reference, R, within a particular variable lifetime.

1. If the loop does not have a primary induction variable that increments by 1, insert one with its initialization, increment and reset operations.

2. In block 70 select a variable reference within the current lifetime.

3. In block 72 select a set of induction variables for this reference.

4. In block 74 let t be the primary induction variable and $x_i$ another induction variable with stride (increment) of $d_i$. Let c be a constant that is either arbitrarily chosen or is chosen to represent a key value and $c_i$ is an arbitrary constant. We then create an array row corresponding to the equation: x=dt+c. We have one such row, with different values of c and d for each induction variable in the input set, creating an intial matrix.

5. In block 76 apply a series of row operations to this initial matrix to create the masking array. For each row, multiply that row by a random constant and add the resulting row to each of the other rows in turn with a different multiplier for each.

6. In block 78 add the masking matrix to the color matrix for this lifetime to create a reference matrix which corresponds to a new cloaked memory reference.

7. In block 80 determine the range for each dimension of the new encrypted reference.

8. In block 82 if there are more references to process within this lifetime, go back to step (F)2.

It is to be understood that while the invention has been described above in conjunction with preferred specific embodiments, the description and examples are intended to illustrate and not limit the scope of the invention, which is defined by the scope of the appended claims.

For instance, in alternative embodiments, not all lifetimes need be transformed. It may be desirable to not transform those lifetimes in sections of the application program with a very high frequency of execution, such as the innermost loop of deep loop nests.

In other embodiments the generation of separation matrices might be done by the poison row method, described above, insead of by the method using lattice points. In fact, in the above description there are a number of ways of deriving poison rows, including the approach using a constant row and the approach using modified facet equations.

In still other embodiments, path dependent index variables can be incorporated into the processes for deriving separation and masking variables, as discussed above.

REFERENCES

The dependence problem, lattices, graph coloring and related issues are discussed in detail in the following references 1. Allen, J. R, K. Kennedy, C. Porterfield and J. Warren, "Conversion of control dependence to data dependence", Proc. Of the $10^{th}$ ACM Symposium on Principles of Programming Languages, pp. 177–189, January 1983, 2. Briggs, P., K. Cooper, K. Kennedy and L. Torczon, "Digital Computer Register Allocation and Code Spilling Using Interference Graph Coloring", U.S. Pat. No. 5,249,295.

3. Chaitin, G., "Register Allocation and Spilling Via Graph Coloring", U.S. Pat. No. 4,571,678.

4. Kuck, D. J., R. H. Kuhn, D. A Padua, B. Leasure and M. Wolfe, "Dependence graphs and compiler optimizations", Proc. Of the $8^{th}$ ACM Symposium on Principles of Programming Languages, pp. 207–218, January 1981, 5. Schrijver, Alexander, *Theory of Integer and Linear Programming*, John Wiley, New York, 1986, pp. 45–59, 6. Wallace, David, "Dependence of Multi-Dimensional Array References", Proceedings of the International Conference on Supercomputing, July 1988, pp. 418–428, which are hereby incorporated by reference. The references of Allen, Kuck and Wallace discuss the dependence problem. The references of Briggs and Chaitin discuss interference graphs derived from lifetimes and their coloring. The reference of Schrijver discusses lattices.

What is claimed is:

1. A method for utilizing a data processor to protect a software program, comprising:

a) inputting said program;

b) analyzing said program to gather symbol information on one or more original variables used within said program;

c) using said symbol information to compute cloaked variables, with new addressing expressions, corresponding to one or more of said original variables, such that said cloaked variables use dynamic addressing, which changes at runtime, rather than fixed constant addressing;

d) replacing a plurality of said original variables by said cloaked variables, updating said program and thereby creating a protected program;

e) outputting said protected program;

whereby it becomes difficult to determine when two variables refer to the same or different actual memory locations in said protected program and whereby the flow of values through said protected program becomes hidden.

2. A method according to claim 1 further comprising:

a) augmenting said program with a plurality of key variables including program code to initialize said key variables with a plurality of key values;

b) incorporating said key variables into the computation of said new addressing expressions for said cloaked variables;

whereby said protected program cannot run properly without correct said key values being provided.

3. A method according to claim 1 further comprising:

a) augmenting said program with code to gather system identification values at the time said program is running;

b) augmenting said program with code to place said identification values into a plurality of identification variables;

c) incorporating said identification variables into computation of said new addressing expressions for said cloaked variables;

whereby said protected program cannot run properly without correct said identification values being provided.

4. A method according to claim 1 wherein c) further comprises:

a) reading said symbol information;

b) replacing a plurality of said original variables by said cloaked variables such that given any two said cloaked variables with conflicting lifetimes where the difference of the addressing expressions for two said cloaked variables is formed into a different matrix, said difference matrix having only non-zero solutions within the operation of said program;

whereby it is assured that no two of said cloaked variables, in fact, do not conflict during the operation of said program.

5. A method according to claim 1 wherein c) further comprises:

a) reading said symbol information;

b) replacing a plurality of said original variables by said cloaked variables such that given any two said cloaked variables within the same lifetime where the difference of the addressing expressions for two said cloaked variables is formed into a masking matrix, said masking matrix derivable, via a series of simple matrix row operations, from a matrix with each row clearly of zero value, based on the relationship among addressing and induction variables in the program;

whereby two said original variables that both, before cloaking, used to refer obviously to the same storage location, now appear, after replacement with said cloaked variables, to refer to different storage locations.

6. A method for utilizing a data processor to protect a software program, comprising:

a) inputting said program;

b) analyzing said program to gather symbol information on one or more original variables used within said program;

c) using said symbol information to compute cloaked variables, with new addressing expressions, corresponding to one or more of said original variables, such that said cloaked variables use dynamic addressing, which changes at run-time, rather than fixed constant addressing;

d) replacing a plurality of said original variables by said cloaked variables, updating said program and thereby creating a protected program;

e) outputting said protected program;

whereby it becomes difficult to determine when two variables refer to the same or different actual memory locations in said protected program and whereby the flow of values through said protected program becomes hidden wherein c) further comprises f) analyzing a plurality of lifetimes of said original variables used in said program and forming a lifetime conflict graph;

g) coloring each of a plurality of lifetimes of said conflict graph with a color matrix that is computed using a means such that the matrix corresponding to the difference of the corresponding said color matrices for two said lifetimes that conflict, has no zero solution;

h) using said symbol information, forming a plurality of equations representing relations among variable addressing expressions, including induction variable addressing expressions;

i) forming a masking matrix for each of said lifetimes and for each color within a single said lifetime, by writing a plurality of said equations as matrix rows, combining said rows into a matrix and applying random row operations to said matrix, forming a masking matrix, and then adding said masking matrix to said color matrix for said single lifetime, forming the reference matrix for said reference;

j) transforming each reference matrix into an array variable reference which is said cloaked variable with said new addressing expression.

7. A method according to claim 6, wherein g) said conflict graph comprises:

k) assigning a color matrix to an uncolored node or lifetime, not yet so colored, by choosing a color matrix not represented among the color matrices already assigned to neighbors of said uncolored node; if a previously used color matrix is not among said color matrices already assigned to said neighbors, then assigning said previous used color matrix to said uncolored node; otherwise deriving a new color matrix to assign to said uncolored node;

l) deriving said new color matrix, when required in step a) above, by choosing an arbitrary matrix if this is the first of said new color matrices; otherwise deriving subsequent color matrices by adding a new separation matrix to the previous color matrix;

m) deriving said new separation matrix, when required in step b) above, by deriving a matrix by means such that said new separation matrix has no zero solution within said program and such that the sum of said new separation matrix with any plurality of separation matrices previously derived in this step is a matrix, also with no zero solution within said program.

8. A method according to claim 7, wherein m) further comprises:

n) deriving a plurality of inequality constraints from said derived program, creating a constraint island;

o) choosing a lattice whose points do not meet said constraint island and that further said lattice is chosen so that the corresponding points, with the same lattice coefficients, of the previously chosen lattices fall within a convex region that also does not meet said constraint island;

p) forming said lattice's vector generators into column vectors which are combined together to form a partial matrix which is further combined with rows corresponding to said constraints from step n) to form the separation matrix.

9. A method for utilizing a data processor to create matrices, called separation matrices, that do not have zero solutions within certain regions of an application program, comprising the steps of:

a) analyzing said application program to derive a plurality of inequality constraints for a particular region of said program, creating a constraint island;

b) choosing a lattice whose points do not meet said constraint island;

c) forming said lattice's vector generators into column vectors which are combined together to form a partial matrix which is further combined with rows corresponding to said constraints from step a) to form the separation matrix;

whereby the separation matrix does not have a zero solution within said region of said application program.

a) a means of augmenting said program with a plurality of key variables including program code to initialize said key variables with a plurality of key values;

b) a means of incorporating these said key variables into the computation of said new addressing expressions for said cloaked variables;

whereby said protected program cannot run properly without the correct said key values being provided.

10. A method according to claim 9 wherein a means is provided to select a series of separation matrices such that the componentwise sum of a plurality of matrices from said series is a matrix which is again a separation matrix.

11. A method for utilizing a data processor to create matrices, called masking matrices, that only have zero solutions within certain regions of an application program, comprising the steps of:

a) analyzing said application program to derive a plurality ot equality constraints for a particular region of said program, including, but not limited to, induction variable relations;

b) forming said equality constraints into rows to form a matrix;

c) applying random row operations to said matrix to form the masking matrix;

whereby the masking matrix has only a zero solution within said region of said application program.

12. An apparatus for modifying a software application program to put it into a protected form, comprising:

a) a means of inputting said program;

b) a means of analyzing said program to gather symbol information on a plurality of original variables used within said program;

c) a means of using said symbol information to compute cloaked variables, with new addressing expressions, corresponding to a plurality of said original variables using a means such that said cloaked variables use dynamic addressing, which changes at run-tine, rather than fixed constant addressing;

d) a means of replacing a plurality of said original variables by said cloaked variables, updating said program and thereby creating a protected program;

e) a means of outputting said protected program;

whereby it becomes difficult to determine when two variables refer to the same or different actual memory locations in said protected program and whereby the flow of values through said protected program becomes hidden.

13. An apparatus according to claim 12 further including:

a) a means of augmenting said program with a plurality of key variables including program code to initialize said key variables with a plurality of key values;

b) a means of incorporating these said key variables into the computation of said new addressing expressions for said cloaked variables;

whereby said protected program cannot run properly without the correct said key values being provided.

14. An apparatus for modifying a software application program to put it into a protected form, comprising:

a) a means of inputting said program:

b) a means of analyzing said program to gather symbol information on a plurality of original variables used within said program;

c) a means of using said symbol information to compute cloaked variables, with new addressing expressions, corresponding to a plurality of said original variables using a means such that said cloaked variables use dynamic addressing, which changes at run-time, rather than fixed constant addressing;

d) a means of replacing a plurality of said original variables by said cloaked variables, updating said program and thereby creating a protected program;

e) a means of outputting said protected program;

whereby it becomes difficult to determine when two variables refer to the same or different actual memory locations in said protected program and whereby the flow of values through said protected program becomes hidden;

f) a means of augmenting said program with code to gather system identification values at the time said program is running;

g) a means of augmenting said program with code to place said identification values into a plurality of identification variables;

h) a means of incorporating these said identification variables into the computation of said new addressing expressions for said cloaked variables;

whereby said protected program cannot run properly without the correct said identification values being provided.

15. An apparatus according to claim 12 wherein the means c) comprises:

a) a means of reading said symbol information;

b) a means of replacing a plurality of said original variables by said cloaked variables such that given any two said cloaked variables with conflicting lifetimes where we have formed the difference of the addressing expressions for two said cloaked variables into a difference matrix, this said difference matrix has only non-zero solutions within the constraints of said program;

whereby we are assured that two said cloaked variables, in fact, do not conflict during the operation of said program.

16. An apparatus according to claim 12 wherein the means c) comprises:

a) a means of reading said symbol information;

b) a means of replacing a plurality of said original variables by said cloaked variables such that given any two said cloaked variables within the same lifetime where we have formed the difference of the addressing expressions for two said cloaked variables into a masking matrix, this said masking matrix is derivable, via a series of simple matrix row operations, from a matrix with each row clearly of zero value, based on the relationship among addressing and induction variables in the program;

whereby two said original variables that both, before cloaking, used to refer obviously to the same storage location, now appear, after replacement with said cloaked variables, to refer to different storage locations.

17. An apparatus for modifying a software application program to put it into a protected form, comprising:

a) a means of inputting said program;

b) a means of analyzing said program to gather symbol information on a plurality of original variables used within said program;

c) a means of using said symbol information to compute cloaked variables, with new addressing expressions, corresponding to a plurality of said original variables using a means such that said cloaked variables use dynamic addressing, which changes at run-time, rather than fixed constant addressing;

d) a means of replacing a plurality of said original variables bv said cloaked variables, updating said program and thereby creating a protected program;

e) a means of outputting said protected program;

whereby it becomes difficult to determine when two variables refer to the same or different actual memory locations in said protected program and whereby the flow of values through said protected program becomes hidden; wherein the means c) of computing said cloaked variables with said new addressing expressions, corresponding to a plurality of said original variables comprises:

f) a means of analyzing a plurality of lifetimes of said original variables used in said program and forming a lifetime conflict graph;

g) a means of coloring each of a plurality of lifetimes of said conflict graph with a color matrix that is computed using a means such that the matrix corresponding to the difference of the corresponding said color matrices for two said lifetimes that conflict, has no zero solution;

h) a means of using said symbol information, forming a plurality of equations representing relations among variable addressing expressions, including induction variable addressing expressions;

i) a means of forming a masking matrix for each lifetime and for each reference within a single lifetime, by writing a plurality of said equations as matrix rows, combining said rows into a matrix and applying random row operations to said matrix, forming a masking matrix, and then adding said masking matrix to said color matrix for said single lifetime, forming the reference matrix for said reference;

j) a means of transforming each reference matrix into an array variable reference which is said cloaked variable with said new addressing expression.

18. An apparatus according to claim 17, wherein the means b) of coloring lifetimes of said conflict graph comprises:

a) a means of assigning a color matrix to an uncolored node or lifetime, not yet so colored, by choosing a color matrix not represented among the color matrices already assigned to neighbors of said uncolored node; if a previously used color matrix is not among said color matrices already assigned to said neighbors, then assigning said previously used color matrix to said uncolored node; otherwise deriving a new color matrix to assign to said uncolored node;

b) a means of deriving said new color matrix, when required in step a) above, by choosing an arbitrary matrix if this is the first of said new color matrices; otherwise deriving subsequent color matrices by adding a new separation matrix to the previous color matrix;

c) a means of deriving said new separation matrix, when required in step b) above, by deriving a matrix by means such that said new separation matrix has no zero solution within said program and such that the sum of said new separation matrix with any plurality of separation matrices previously derived in this step is a matrix, also with no zero solution within said program.

19. An apparatus according to claim 18, wherein the means c) of deriving said new separation matrix comprises:

a) a means of deriving a plurality of inequality constraints from said derived program, creating a constraint island;

b) a means of choosing a lattice whose points do not meet said constraint island and that further said lattice is chosen so that the corresponding points, with the same lattice coefficients, of the previously chosen lattices fall within a convex region that also does not meet said constraint island;

c) a means of forming said lattice's vector generators into column vectors which are combined together to form a partial matrix which is further combined with rows corresponding to said constraints from step a) to form the separation matrix.

20. An apparatus to create matrices, called separation matrices, that do not have zero solutions within certain regions of an application program, comprising:

a) a means of analyzing said application program to derive a plurality of inequality constraints for a particular region of said program, creating a constraint island;

b) a means of choosing a lattice whose points do not meet said constraint island, c) a means of forming said lattice's vector generators into column vectors which are combined together to form a partial matrix which is further combined with rows corresponding to said constraints from step a) to form the separation matrix;

whereby the separation matrix does not have a zero solution within the operation of said application program.

21. An apparatus according to claim 20, wherein a means is provided to select a series of separation matrices such that the componentwise sum of a plurality of matrices from said series is a matrix which is again a separation matrix.

22. An apparatus to create matrices, called masking matrices, that only have zero solutions within certain regions of an application program, comprising:

a) a means of analyzing said application program to derive a plurality of equality constraints for a particular region of said program, including, but not limited to, induction variable relations;

b) a means of forming said equality constraints into rows to form a matrix;

c) a means of applying random row operations to said matrix to form the masking matrix;

whereby the masking matrix has only a zero solution within the operation of said application program.

* * * * *